United States Patent
Dickens et al.

(10) Patent No.: US 9,065,760 B2
(45) Date of Patent: Jun. 23, 2015

(54) PRIORITY DATA TRANSMISSION USING FIBRE CHANNEL OVER ETHERNET

(75) Inventors: Louie A. Dickens, Tucson, AZ (US); Roger G. Hathorn, Tucson, AZ (US); Richard Hutzler, Ocean Shores, WA (US); William M Smith, Jr., Rochester, MN (US); Michael E. Starling, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 12/854,048

(22) Filed: Aug. 10, 2010

(65) Prior Publication Data

US 2012/0039604 A1 Feb. 16, 2012

(51) Int. Cl.
*H04L 12/851* (2013.01)
*H04L 12/801* (2013.01)

(52) U.S. Cl.
CPC ............. *H04L 47/2441* (2013.01); *H04L 47/12* (2013.01)

(58) Field of Classification Search
CPC ...... H04L 47/12; H04L 47/24; H04L 47/2441
USPC ......................................... 370/238
See application file for complete search history.

(56) References Cited

U.S. PATENT DOCUMENTS

| 6,993,043 | B1* | 1/2006 | Aldermeshian et al. ....... 370/466 |
| 7,382,728 | B2 | 6/2008 | Chen et al. | |
| 2001/0043565 | A1* | 11/2001 | Chen et al. ..................... 370/230 |
| 2006/0013128 | A1* | 1/2006 | Connor et al. ................. 370/229 |
| 2006/0165002 | A1* | 7/2006 | Hicks et al. .................... 370/248 |
| 2009/0161692 | A1* | 6/2009 | Hirata et al. ................... 370/466 |

OTHER PUBLICATIONS

Wadekar, Manoj. "DCBX Capability Exchange Protocol Base Specification" Rev 1.0, Jul. 16, 2008, www.ieee802.org.*

* cited by examiner

*Primary Examiner* — Huy D Vu
*Assistant Examiner* — Stephen J Clawson
(74) *Attorney, Agent, or Firm* — Kunzler Law Group

(57) ABSTRACT

An apparatus, system, and method are disclosed for handling data being communicated over lossless Ethernet that is sensitive to delays. Fiber Channel over Ethernet (FCoE) is one example of an environment where data may be subject to unacceptable delays. The method involves designating certain data as low latency data that is sensitive to delays in transmission. The low latency data is then transmitted in such a manner that the receiving devices are aware that they are receiving low latency data. If a delay in the transmission of low latency is detected, commands are issued that pause or slow standard data in order to free up bandwidth for the low latency data. The commands may be, for example, backward congestion notifications and priority flow control. Low latency data is exempted from backward congestion notifications and priority flow control. Priority 7 priority group 15 may be reserved exclusively for low latency data.

14 Claims, 4 Drawing Sheets

PRIORITY DATA TRANSMISSION USING FIBRE CHANNEL OVER ETHERNET

FIELD

The subject matter disclosed herein relates to transmitting data over Ethernet with minimal delays, and more particularly relates to transmitting data over Ethernet in accordance with Fibre Channel over Ethernet (FCoE).

BACKGROUND

Description of the Related Art

Ethernet is a ubiquitous networking technology popular in various network environments. Many data centers use Ethernet for TCP/IP networks. Many of these same data centers use Fibre Channel (FC) for storage, such as a storage area network (SAN). Fibre Channel over Ethernet (FCoE) is an encapsulation of FC frames and allows FC communication over Ethernet, which can significantly reduce costs, cabling, and complication.

In order to support FCoE, certain changes to Ethernet are required; for example, the Ethernet protocol may be enhanced to improve reliability and ensure there is no loss of FCoE frames. Changes and enhancements may compensate for the fact that Ethernet, unlike FC, has no flow control. The various enhancements make Ethernet suitable for communicating FC frames, but can have a negative impact on performance.

In particular, FCoE may struggle with increased latency. For many types of data, this increase in latency may not pose a serious problem. However, certain types of data may be particularly sensitive to latency. For such data, the inherent latency gaps in Ethernet may cause significant problems.

BRIEF SUMMARY

The present invention has been developed in response to the present state of the art, and in particular, in response to the problems and needs in the art that have not yet been fully solved by currently available systems. Accordingly, the present invention has been developed to provide an apparatus, system, and method for improved support of low latency data that overcome many or all of the above-discussed shortcomings in the art.

The apparatus to support low latency data transmitted over Ethernet is provided with a plurality of modules. These modules in the described embodiments include a designation module, a transmission module, a detection module, and a bandwidth module.

In one embodiment, the designation module is configured to designate data being transmitted over an Ethernet connection as either low latency data or standard data. The transmission module is configured to transmit the low latency data and to indicate that the low latency data being transmitted is low latency data. The detection module is configured to detect delays in the transmission of the low latency data, and the bandwidth module is configured to issue commands affecting the standard data and reducing the delays in the transmission of the low latency data over the Ethernet connection.

In certain embodiments, the apparatus may include a notify module that indicates that a particular device supports transmission of low latency data. For example, the notify module may use a type length value (TLV) of the data center bridging capability exchange protocol (DCBX) to indicate support for low latency data.

A system of the present invention is also presented to support transmitting data over Ethernet. The system may be embodied in a network including a TCP/IP Ethernet LAN and a Fibre Channel SAN. In particular, the system, in one embodiment, includes a first FCoE device and a second FCoE device. Each FCoE device may be configured to support low latency data transmission and to transmit low latency data with an indication that the data is low latency data. In one embodiment, this is done by transmitting the data using priority 7 priority group 15. Each FCoE device may be configured to issue commands affecting only standard data and that reduce the delays in transmission of low latency data if the FCoE device detects delays in the transmission of the low latency data.

A method of the present invention is also presented for transmitting data over Ethernet. The method in the disclosed embodiments substantially includes the steps necessary to carry out the functions presented above with respect to the operation of the described apparatus and system. In one embodiment, the method includes designating data to be transmitted over an Ethernet connection as either low latency data or standard data. The method also may include transmitting the low latency data and indicating that the data is low latency data. The method may also involve detecting one or more delays in the transmission of the low latency data, which delays are caused by the standard data. The method may involve, in response, issuing one or more commands affecting only the standard data and thereby reducing the delays in the transmission of the low latency data over the Ethernet connection.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
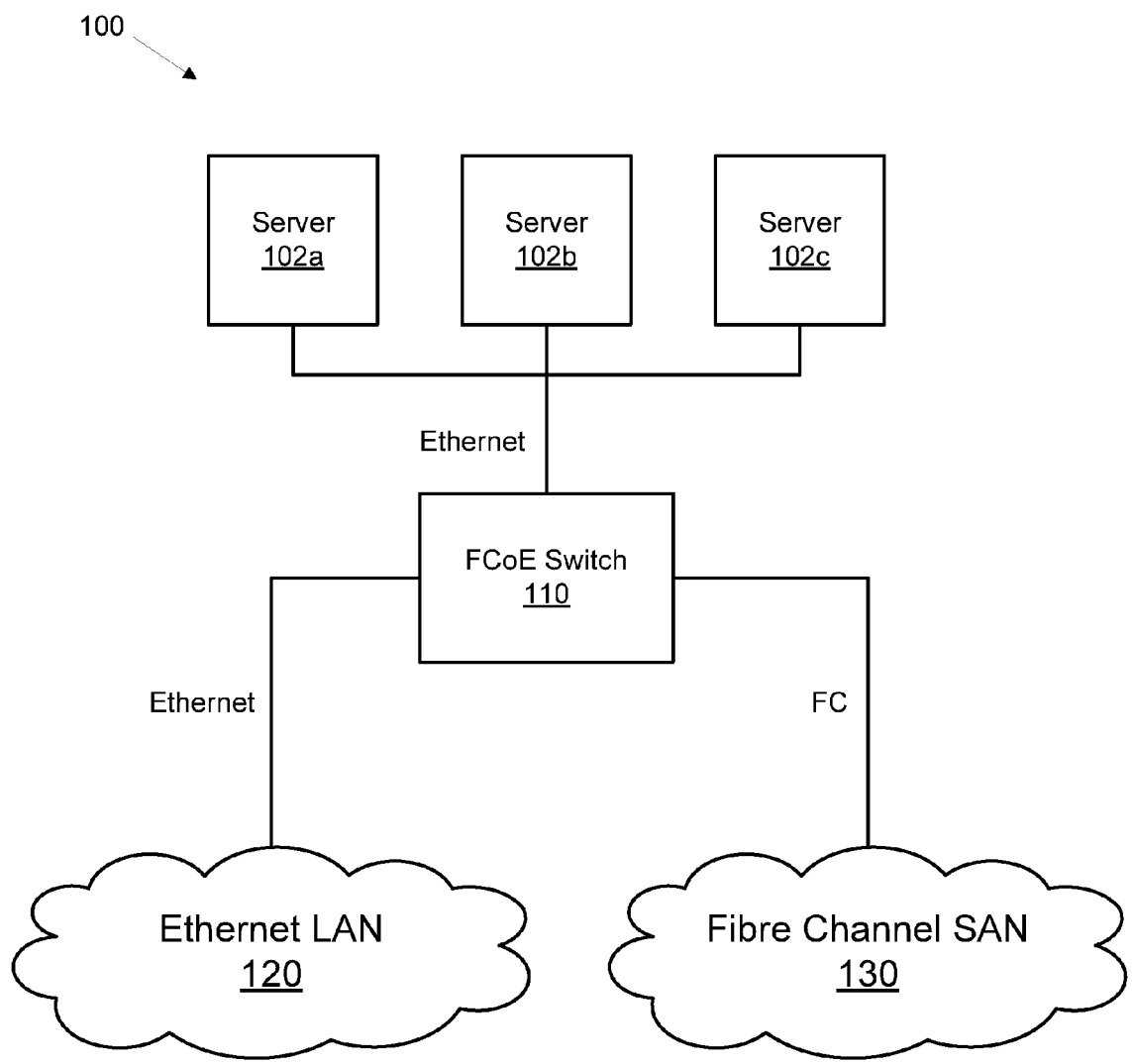
FIG. 1 is a schematic block diagram illustrating one embodiment of a system supporting low latency data transmission.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one example of a system 100 that may benefit from the low latency transmission of data. The system 100 is one example of the many possible different topologies and configurations for an FCoE environment. Many configurations of a system 100 may benefit from low latency transmission of data, and the system 100 is presented as only one example. The system 100 includes servers 102a-c, an FCoE switch 100 (sometimes referred to as a Fibre Channel Forwarder), Ethernet local area network (LAN) 120, and Fibre Channel storage area network (SAN) 130.

In certain embodiments, the system 100 implements FCoE and maps FC natively over Ethernet in a manner that is independent of the Ethernet forwarding scheme. In many datacenters, companies use both an Ethernet LAN 120 for TCP/IP networks, and a FC SAN 130 for storage. Rather than have many separate Ethernet network interface cards (NICs) and Fibre Channel host bus adapters (HBAs) in the servers 102a-c, the FCoE implementation shown in FIG. 1 uses a converged network adapter (CNA) that can manage both TCP/IP and FC traffic. Both TCP/IP and FC traffic can then flow over the Ethernet connection between the servers 102a-c and the FCoE switch 110. The FCoE switch 110 can then appropriately un-package and direct the TCP/IP traffic and FC traffic to either the Ethernet LAN 120 or the FC SAN 130 as appropriate.

One challenge of using Ethernet for Fibre Channel is that FC is a lossless transport. Ethernet is typically not lossless and uses a packet drop flow control approach to manage congestion. However, dropping FC packets is not an acceptable option. As such, FCoE generally makes use of Ethernet's PAUSE capability, or the new priority pause, which allows a busy port to send commands (such as a control frame) to the transmit port requesting a pause in transmission. For example, a FCoE device (such as the FCoE switch 110) may issue commands such as a backward congestion notification which tells a port or switch to slow down or stop sending FCoE frames due to congestion sensed in the receipt of the data by the FCoE device. FCoE device refers generally to computing devices that are configured to transmit information in accordance with the FCoE specification. An FCoE device may be, for example, a server configured with a CNA, an FCoE switch, an Ethernet Bridge, or other computing device. The FCoE device may also issue a command such as priority flow control, which pauses traffic for a given amount of time. While these features and actions are necessary to ensure a lossless connection for FC frames over FCoE, they may also impede critical data and unacceptably increase the delay associated with delivering critical data.

Figure 2:
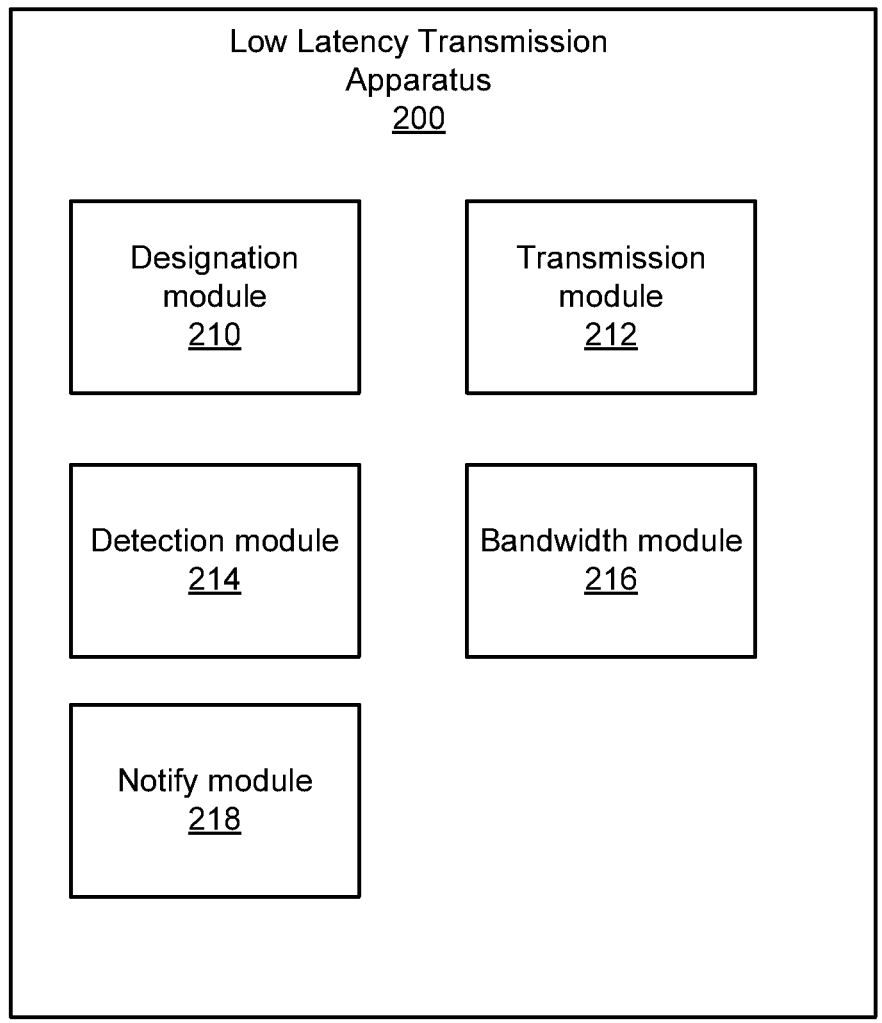
FIG. 2 is a schematic block diagram illustrating one embodiment of a low latency transmission apparatus.

FIG. 2 illustrates one embodiment of a low latency transmission apparatus 200 including a designation module 210, a transmission module 212, a detection module 214, a bandwidth module 216, and a notify module 218. The low latency transmission apparatus 200 may include one or more of the modules above, depending on the needs of the particular embodiment. The low latency transmission apparatus 200, in certain embodiments, is implemented on one or more FCoE devices in a system.

The low latency transmission apparatus 200 supports the transmission of low latency data over Ethernet. As used in this specification, low latency data refers to data that is sensitive to delays in transmission. In certain embodiments, only FC data can be designated low latency data. In other embodiments, various types of data (including FC and TCP/IP data) can be designated low latency data. In certain embodiments, an administrator of a system specifies which classifications of data are low latency data. The low latency transmission apparatus 200 may be configured to designate certain data as low latency data by default. Those of skill in the art will appreciate the various means by which an administrator, a device developer, an application developer, or other user may decide that data is low latency data as that term is defined above.

In certain embodiments, various types of data may be designated as low latency data. For example, the designation need not be limited to FC frames in FCoE. In certain embodiments, the user may designate particular FCoE traffic as low latency data, but may also designate particular TCP/IP, VoIP, Infiniband, or other type of data to be low latency data. As such, the designation of low latency data may be available for multiple protocols traveling in accordance with the Ethernet transport protocol.

The notify module 218 indicates that an FCoE device supported by the low latency transmission apparatus supports the transmission of low latency data. In one embodiment, the notify module 218 does so using a time length value (TLV) of the data center bridging capability exchange protocol (DCBX). DCBX is an FCoE protocol used to indicate to other ports of FCoE devices that the particular FCoE device supports enhanced Ethernet. The DCBX may be carried in an Ethernet frame as part of link layer discovery protocol (LLDP). DCBX is generally broken down into TLVs. TLVs generally describe support for a function and the parameters that the function supports. As noted above, the notify module 218 may use a new TLV to indicate support for low latency data transmission. In one implementation, priority 7, priority group 15 is reserved for low latency data delivery.

The low latency transmission apparatus 200 may also include a designation module 210. The designation module 210 designates data being transmitted over the Ethernet connection as either low latency data (as defined above) or standard data. As used in this specification, standard data refers broadly to any data that does not have the low latency designation. In one embodiment, the designation module 210 designates data as low latency data in response to user input. For example, a user may specify that data from a particular application is critical and therefore low latency data. The designation module 210 may be configured to identify data that is sensitive to delay and to designate such data as low latency data. Where the FCoE device is receiving the data from another FCoE device, the designation module 210 may determine whether or not the data is low latency data (and make the appropriate designation) based on information sent with, or derived from, the data. For example, the designation module 210 may designate all data received with priority 7, priority group 15 as low latency data. Priority 7, priority group 15 may be chosen since this group, by default, is not subject to bandwidth limitations; however, other priorities can also be successfully used to designate low latency data. In addition, approaches other than the use of priority groups can also be used to designate low latency data.

The transmission module 212 transmits the low latency data and indicates that the low latency data being transmitted is, in fact, low latency data. The transmission module may be so by using priority 7, priority group 15 for sending or forwarding low latency data, thus showing which data is low latency data. In certain embodiments, the enhanced transmission selection (ETS) is altered to reserve a new priority 7, with a new priority group 15, for low latency data. ETS defines different types of traffic and allows a user to assign bandwidth to that particular type of traffic. Currently, the FCoE protocol allows that a priority group 3 is used for FCoE traffic.

The detection module 214 detects one or more delays in the transmission of low latency data over the Ethernet connection. The detection module 214 may thereby discover the existence of delays of low latency data. In certain embodiments, the detection module 214. The detection module 214 may also be responsible for monitoring congestion. Thus, the detection module 214 may be an enhancement to existing components in FCoE devices responsible for managing traffic.

The bandwidth module 216 issues one or more commands that affect only the standard data such that delays in the transmission of the low latency data over the Ethernet connection are reduced. In certain embodiments, bandwidth module 216 sends out such commands in response to the detection module 214 detecting delays in the transmission of the low latency data. In one embodiment, the commands include backward congestion notifications. Backward congestion notification tells a port to slow down or stop sending FCoE frames due to congestion sensed in the receipt of data. Thus, the bandwidth module 216 may send backward congestion notifications that affect standard data in order to free up bandwidth for the low latency data.

Similarly, the bandwidth module 216 may issue commands that include priority flow control. As above, priority flow control commands can be sent to pause traffic for a given amount of time to relieve congestion and allow for reliable delivery. The bandwidth module 216 may issue priority flow control commands to ports in order to free up bandwidth for low latency data.

In certain embodiments, the bandwidth module 216 exempts low latency data from commands that affect latency. For example, the low latency data may be exempted from backward congestion notification such that low latency data is not subject to a backward congestion notification. Similarly, the low latency data may be exempted from priority-based flow control such that low latency data is not subject to priority flow control. In certain embodiments, the exemption is implemented by specifying that data associated with priority 7, priority group 15 is not subject to backward congestion notification or priority flow control. In such embodiments, the commands will not slow, pause, or otherwise delay low latency data.

Figure 3:
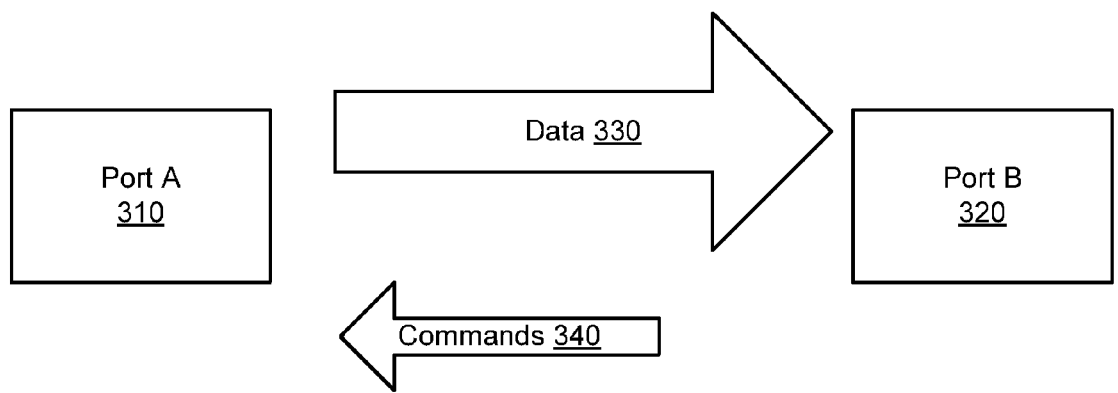
FIG. 3 is an exemplary diagram showing one instance of data and commands being exchanged between ports.

FIG. 3 shows one example of a case involving communication between a port A 310 and a port B 320. In one embodiment, the port A 310 is associated with a first FCoE device, and the port B 320 is associated with a second FCoE device. In one embodiment, the ports A and B are associated with FCoE switches. In the depicted embodiment, port A 310 sends data 330 to port B 320. The data 330 may include standard data and low latency data. The port B 320 receives the data 330 and, in certain embodiments, forwards the data 330 to the next appropriate port. The data 330 is appropriately designated as low latency data and standard data. While FIG. 3 shows the data 330 as a unitary arrow, it will be appreciated that low latency data and standard data may travel in the same logical lane, or in separate lanes. Similarly, a user may configure a system to use certain lossless lanes for FCoE communications, and other lanes for regular Ethernet traffic. Thus, variations on the example shown in FIG. 3 are within the scope of the present invention.

In certain embodiments, the port B may determine that the low latency data is being delayed by the standard data in the data 330. In response, the port B may issue one or more commands 340 to reduce the delays in the transmission of the low latency data. In one embodiment, the commands 340 include backward congestion notifications that tell port A 310 to slow or stop sending frames due to the delays being imposed on low latency data. The backward congestion notifications do not, however, affect low latency data coming from port A 310; that is, port A will slow or stop standard data, but will not stop or slow low latency data. The commands 340 may also include priority flow control commands which pause traffic from port A 310 for a given amount of time. As above, in certain embodiments, the priority flow control commands do not pause low latency data; rather, the priority flow control commands pause only the standard data.

In certain embodiments, the port B 320 may send commands 340 to port A 310 even if the low latency data is not being unduly blocked by standard data if the port B 320 determines that it is congested and must slow traffic in order to prevent data loss. In certain embodiments, the commands 340 sent by port B 320 to port A 310 do not affect the low latency data; that is, low latency data is generally exempt from traffic control mechanisms such as backward congestion notification and priority flow control to the extent that such mechanisms slow and thereby increase the latency of the low latency data.

Figure 4:
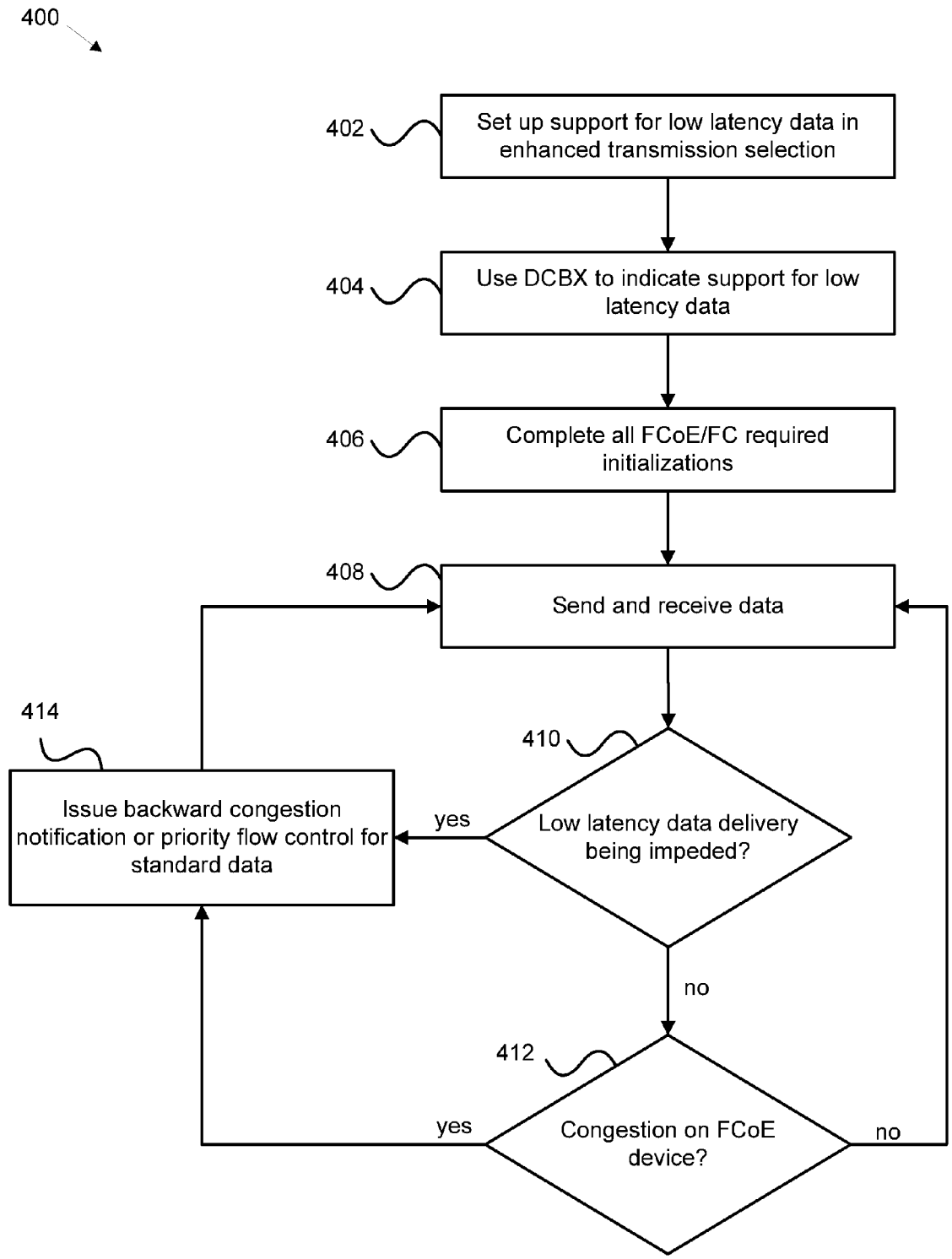
FIG. 4 is a schematic flow chart diagram illustrating one embodiment of a method for supporting low latency data transmission.

FIG. 4 shows one embodiment of a method 400 for providing enhanced support of low latency data in a lossless Ethernet environment. The method 400 begins with setting up 402 support for low latency data in enhanced transmission selection (ETS). ETS allows for the creation of different priority groups, where each priority group can be given a separate priority value. In one embodiment, priority 7 priority group 15 is used for low latency data.

The method may also include using 404 DCBX to indicate support for low latency data. As noted above, DCBX is carried in an Ethernet frame generally referred to in Ethernet as Link Layer Discovery Protocol (LLDP). DCBX may be broken down in TLVs that describe support for a function and the parameters the function supports. A new TLV may be used to indicate support for low latency data delivery. In one embodiment, the TLV may indicate that priority 7, coupled with priority group 15, is reserved for low latency data.

The method may also involve competing 406 all FCoE/FC required initializations, followed by sending 408 and receiving data. As noted above, this data may be low latency data, standard data, and a combination of the two. The method also involves determining 410 whether low latency data delivery is being impeded by standard data. If standard data is impeding low latency data, the method involves issuing 414 backward congestion notifications and/or priority flow control for standard data. With the delays removed, the method continues sending and receiving 408 data.

The method may also involve determining 412 whether there is congestion on the FCoE device. If there is congestion, the FCoE device may issue backward congestion notifications or priority flow control commands in order to prevent the FCoE device from being overrun and losing data. However, as noted above, the backward congestion notifications and priority flow control commands are directed only to standard data. Low latency data is not slowed, paused, or delayed by the commands. As a result, the FCoE device can protect itself from being overrun, but without causing delays to the low latency data.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for improved delivery of data over Ethernet implementing Fibre Channel over Ethernet (FCoE), the method comprising:
designate data to be transmitted over an Ethernet connection as one of low latency data and standard data;
indicating that a FCoE device supports transmission of the low latency data using a type length value (TLV) of a data center bridging capability exchange protocol (DCBX) as of Aug. 10, 2010;
transmitting the low latency data;
indicating that the low latency data being transmitted is low latency data using TLV priority 7 priority group 15;
detecting one or more delays in the transmission of the low latency data caused by the standard data; and
issuing command to stop a port from sending frames to the Ethernet in response to detecting the one or more delays.

2. The method of claim 1, wherein issuing the command further comprises sending one or more of priority flow control commands and backward congestion notifications.

3. A low latency transmission apparatus to support transmitting data over Ethernet, the apparatus comprising:
a designation module configured to designate data being transmitted over an Ethernet connection as one of low latency data and standard data;
a notify module configured to indicate that a Fibre Channel over Ethernet (FCoE) device supports transmission of the low latency data using a type length value (TLV) of a data center bridging capability exchange protocol (DCBX) as of Aug. 10, 2010;
a transmission module configured to transmit the low latency data and to indicate that the low latency data being transmitted is low latency data using TLV priority 7 priority group 15;
a detection module configured to detect one or more delays in the transmission of the low latency data; and
a bandwidth module configured to issue a command to stop a port from sending frames to the Ethernet in response to detecting the one or more delays.

4. The apparatus of claim 3, wherein FCoE is exempt from the command issued by the bandwidth module.

5. The apparatus of claim 3, wherein issuing the command further comprises issuing a priority flow control command for the standard data.

6. The apparatus of claim 3, wherein issuing the command further comprises issuing a backward congestion notification for the standard data.

7. The apparatus of claim 3, wherein the apparatus supports FCoE.

8. The apparatus of claim 3, wherein priority 7 priority group 15 is reserved for the low latency data.

9. A system to support transmitting data in Fibre Channel over Ethernet (FCoE), the system comprising:
a first FCoE device, wherein the first FCoE device is configured to:
indicate that the first FCoE device supports low latency data transmission using a type length value (TLV) of a data center bridging capability exchange protocol (DCBX) as of Aug. 10, 2010;

transmit low latency data to a second FCoE device that supports low latency data transmission;

indicate that the low latency data being transmitted is low latency data by transmitting the low latency data using TLV priority 7 priority group 15;

issue a command to stop a port from sending frames to the Ethernet in response to detecting delays in transmission of the low latency data; and the second FCoE device, wherein the second FCoE device is configured to:

indicate that the second FCoE device supports low latency data transmission;

transmit the low latency data received from the first FCoE device to a third FCoE device that supports low latency data transmission;

indicate that the low latency data being transmitted is low latency data by transmitting the low latency data using priority 7 priority group 15;

issue a command to stop a port from sending frames to the Ethernet in response to detecting delays in transmission of the low latency data.

10. The system of claim 9, wherein issuing the command further comprises issuing one of a priority flow control command for standard data and a backward congestion notification for the standard data.

11. A computer program product comprising a non-transitory computer readable storage medium having computer readable program code executing to perform operations for transmitting data over Ethernet, the operations of the computer program product comprising:

designating data being transmitted over an Ethernet connection as one of low latency data and standard data;

indicating that a Fibre Channel over Ethernet (FCoE) device supports transmission of the low latency data using a type length value (TLV) of a data center bridging capability exchange protocol (DCBX) as of Aug. 10, 2010;

transmitting the low latency data;

indicating that the low latency data being transmitted is low latency data using TLV priority 7 priority group 15;

detecting one or more delays in the transmission of the low latency data; and issuing a command to stop a port from sending frames to the Ethernet in response to detecting the one or more delays.

12. The computer program product of claim 11, wherein issuing the command further comprises issuing a priority flow control command for standard data.

13. The computer program product of claim 11, wherein issuing the command further comprises issuing a backward congestion notification for the standard data.

14. The computer program product of claim 11, wherein priority 7 priority group 15 is reserved for the low latency data.

* * * * *